C. M. LEE.
HAY LOADER.
APPLICATION FILED DEC. 12, 1907.
900,747.
Patented Oct. 13, 1908.
2 SHEETS—SHEET 1.
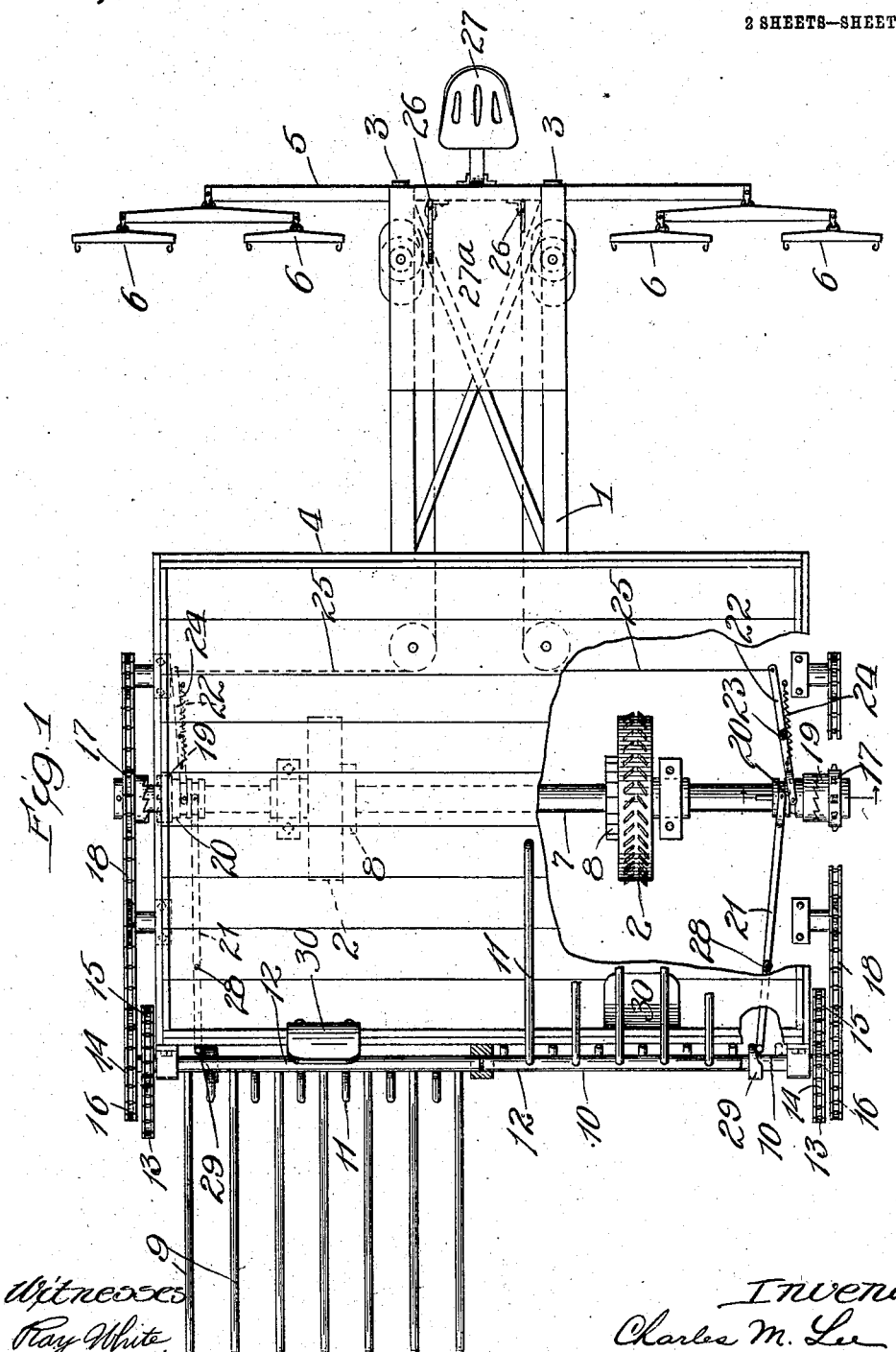

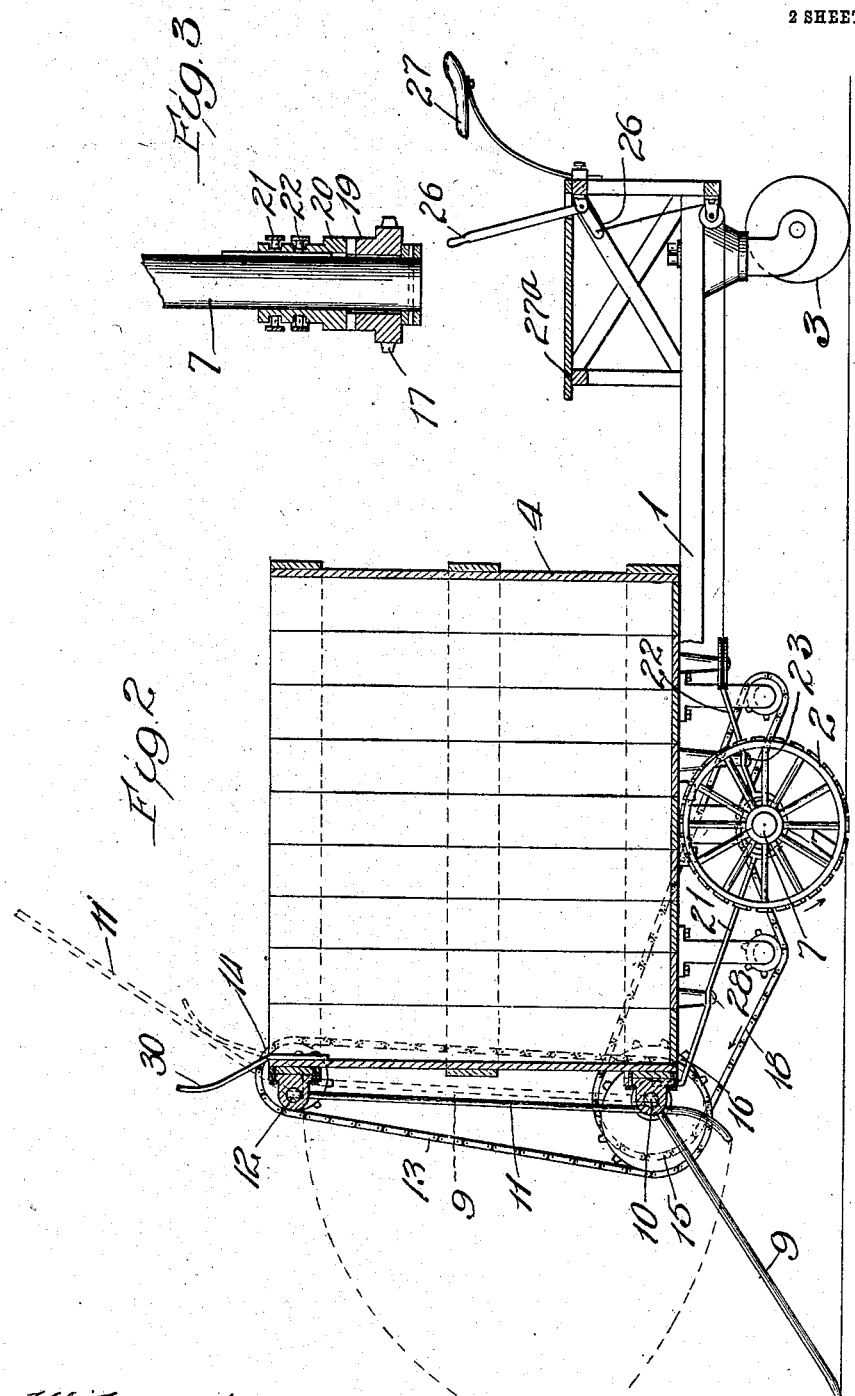

UNITED STATES PATENT OFFICE.

CHARLES M. LEE, OF GIBBON, NEBRASKA.

HAY-LOADER.

No. 900,747.      Specification of Letters Patent.      Patented Oct. 13, 1908.

Application filed December 12, 1907. Serial No. 406,185.

*To all whom it may concern:*

Be it known that I, CHARLES M. LEE, a citizen of the United States of America, and a resident of Gibbon, county of Buffalo, Nebraska, have invented certain new and useful Improvements in Hay-Loaders, of which the following is a specification.

The main object of this invention is to provide an improved form of hay rack loading-apparatus which is particularly suitable for handling alfalfa hay, which, when dry, cannot be handled economically by the usual forms of hay loaders, since the agitation and rehandling causes the foliage thereof to break off from the stalks and sift out of the mass and become lost in the handling. The leaves and smaller twigs constitute about sixty per cent. of the alfalfa plant, most of which is lost in handling with the usual form of loader.

Further objects are to provide a loader for handling hay, grain or similar light materials, and which is sufficiently automatic in its operation as to require little attention from the operator; and to provide improved mechanism for operating a pitching fork so as to gradually accelerate its speed and thereby cause it to throw its load a considerable distance beyond its stopping position.

These objects are accomplished by the device shown in the accompanying drawings, in which—

Figure 1 is a top plan, partly broken away, of a hay rack provided with a loading device constructed according to this invention. Fig. 2 is a side elevation of the same. Fig. 3 is a detail, partly in section, of the clutch which controls the operation of the loading apparatus.

In the construction shown in the drawings, the apparatus comprises a vehicle frame 1 mounted upon wheels 2 and 3 and carrying a suitable receptacle or rack 4 for holding the hay. The frame 1 extends a considerable distance rearward of the rack and is provided with a cross-bar 5 which extends outward at each side and is provided with suitable whiffletrees 6 for connecting draft animals to the vehicle. The rear end of the frame is carried by caster wheels 3, and the rack 5 is so placed that the greater part of its weight will be carried upon the main traction wheels 2.

The traction wheels 2 are loose upon the main shaft 7 and are connected thereto by ratchets indicated in the drawings by their casings 8. These ratchets are provided for the purpose of permitting the wheels 2 to rotate at different relative speeds, so that the vehicle may be easily turned.

Hinged at the front end of the vehicle frame, near the lower part of the receptacle 4, is a lifting fork 9 which, in the form shown, is made in two sections independently operated for the purpose which will hereinafter appear. Each section of the fork 9 is carried by a shaft 10 which is journaled in suitable bearings, with its axis substantially horizontal. The tines of the fork 9 normally extend downwardly and forwardly so that their free ends ride upon the ground as in Fig. 2.

The loading fork 11, also shown in two sections in the drawings, is hinged along the upper part of the front of the rack 4. Each section of the fork 11 is carried by a shaft 12 journaled on the frame above and in parallel relation to the shafts 10. The tines of the fork 11 are so located along the shafts 12 as to extend through the spaces between the tines of the fork 9 when the said forks are in their lowered positions, as in Fig. 2. The forks 9 and 11 are arranged to swing upwardly about their axes to the limiting positions indicated by dotted lines in Fig. 2, their paths being there indicated by dotted arcs.

In the form shown, each section of the fork 11 is geared to the corresponding section of the fork 9 by means of a link belt 13 and the sprockets 14 and 15. These sprocket wheels 14 and 15 are eccentrically journaled or are otherwise arranged so that the fork 11 will move at a gradually increasing speed, reaching a certain maximum when in the elevated position shown by dotted lines in Fig. 2. This has the effect of gently removing the hay from the lifting fork 9 and pitching it with sufficient velocity so that it will be thrown toward the rearward end of the receptacle 4. The sprocket wheels 14 and 15 are also of different diameters, to provide for the greater angular movement of the fork 11 as compared with that of the fork 9. Each of the shafts 10 is geared to the main driving shaft 7 by sprocket wheels 16 and 17, which are connected by a link belt 18.

The sprocket wheels 17 are loose upon the shaft 7 and are connected thereto by means of a clutch having one member 19 rigid on the sprocket 17 and having the other member 20 splined to the shaft 7 and slidable into and out of engagement with the member 19. The clutch member 20 is arranged to be shifted by either of the shifting levers 21 or 22. The lever 22 is pivoted at 23 and is provided with a toggle spring 24 adapted to yieldingly hold the clutch member 20 in either of its limiting positions. The lever 22 is shifted by means of a cord 25 which extends to a lever 26 located in a position where it can be conveniently reached by an operator from the seat 27 on the driver's platform 27ª.

The lever 21 is pivoted at 28 and is operated by means of a cam 29 on the shaft 10, said cam 29 being so formed as to throw the clutch member 20 out of engagement with its mate 19 when the fork 9 reaches the upper limit of its movement. When the clutch is open, the forks are free to swing back to their normal initial position. A spring stop 30 is engaged by the fork 11 as it approaches the upper limit of its movement, and after the opening of the clutch, returns the forks to a position from which their weight will return them to their initial position. This spring yields through engagement with the fork 11, as indicated by dotted lines in Fig. 2.

The operation of the device shown is as follows:—The hay is raked together into heaps or bunches by means of the usual hay rake, said bunches being spaced at proper intervals to suit the operation of the hay loader, as will hereinafter appear. The hay loader is pushed along the field by draft animals attached to the whiffletrees 6, the forks 9 riding upon the surface of the ground and passing under the bunches of hay. As soon as the forks 9 have passed under a bunch of hay, the operator pulls open the lever 26, throwing the clutch member 20 into engagement with its mate 19, and thereby starting the operating mechanism. The power from the wheels 2 is transmitted to the shafts 10 and 12 by the sprockets and link belting hereinbefore described, causing the fork 9 to swing upward and simultaneously causing the fork 11 to also swing upward, lifting the hay from the fork 9.

The form and arrangement of the sprockets 14 and 15 is such that the movement of the fork 11 is at first slow as compared with that of the fork 9. This allows the fork 9 to reach a considerable elevation before the fork 11 engages the hay, and thus insures that the hay is properly transferred from the fork 9 to the fork 11. During the continued movement of the fork 11, its speed increases so that it is finally sufficiently great to throw the hay a considerable distance backward into the receptacle 4. As the fork 11 passes the vertical position, it engages the spring 30, retracting said spring, and as the fork 9 approaches the upper limit of its movement, the cam 29 shifts the lever 21 and disengages the clutch 19, 20. The spring 30 then returns the fork 11 in a forward direction beyond the vertical position, and the weight of the forks finally causes them to return to their normal initial position, as shown by the full lines in Fig. 2.

In the specific embodiment of the invention which is shown in the drawings, the forks are each divided into two sections which operate independently. This is done so that the bunches of hay may be placed at closer intervals and still allow ample time for the forks to return to their initial position after loading a bunch of hay. In this form the bunches of hay are arranged in staggered rows, or if arranged in straight rows the vehicle is moved along a zigzag path so as to bring the lifting forks alternately into position for picking up a load. This division of the forks also reduces the strain upon the traction wheels and insures that said strain is more uniformly distributed throughout the progress of the vehicle.

As the front wheels are free to rotate independently of each other, and as the rear wheels are carried by casters, the vehicle may be easily guided so as to properly direct the forks 9 under the piles of hay. In the drawings, some of the dimensions and relative proportions of various parts, and the angle of inclination of the forks 9, have been exaggerated for the purpose of clearness.

What I claim as my invention and desire to secure by Letters Patent is:—

1. A hay loader, comprising a frame, a lifting fork hinged on said frame and adapted to extend in a forwardly inclined direction toward the ground for picking up hay therefrom, a loading fork hinged on said frame on a separate axis and having tines extending alternately between the tines of said lifting fork, and mechanism operated through the movement of the vehicle for swinging said lifting fork upwardly and simultaneously causing said loading fork to remove the hay from said lifting fork and discharge the same in a rearward direction.

2. In a device of the class described, the combination of a vehicle, a lifting fork hinged thereto on a horizontal axis and adapted to lift hay from the ground, a loading fork hinged on said vehicle on an axis located above that of said lifting fork, and having tines disposed so as to extend into the spaces between the tines on said lifting fork, and mechanism controlling the movements of said forks and adapted to first swing said lifting fork upwardly to lift the hay from the ground, and then cause the tines of said loading fork to swing upwardly through the spaces between the tines of said lifting fork to remove the hay therefrom and discharge it upon the vehicle.

3. The combination of a vehicle, a lifting fork hinged thereon and adapted to normally extend forward in an inclined direction for picking up hay from the ground, a loading fork hinged on said vehicle on an axis above that of said lifting fork and adapted to normally extend downwardly with its tines extending through the spaces between those of said lifting fork, mechanism for swinging said lifting fork upwardly to lift a quantity of hay from the ground, and mechanism for swinging said loading fork so as to remove the hay from said fork and discharge the same in a rearward direction, said loading fork being geared to swing at a greater speed than that of said lifting fork.

4. A hay loader, comprising a frame, a lifting fork hinged on said frame and adapted to extend in a forwardly inclined direction toward the ground for picking up hay therfrom, a loading fork hinged on said frame on a separate axis and having tines extending alternately between the tines of said lifting fork, mechanism operated through the movement of the vehicle for swinging said lifting fork upwardly and simultaneously causing said loading fork to remove the hay from said lifting fork and discharge the same in a rearward direction, and means for automatically disconnecting said forks from their operating mechanism as said loading fork approaches its discharging position.

5. A hay loader, comprising a frame, a lifting fork hinged on said frame and adapted to extend in a forwardly inclined direction toward the ground for picking up hay therefrom, a loading fork hinged on said frame on a separate axis and having tines extending alternately between the tines of said lifting fork, mechanism operated through the movement of the vehicle for swinging said lifting fork upwardly and simultaneously causing said loading fork to remove the hay from said lifting fork and discharge the same in a rearward direction, means for automatically disconnecting said forks from the operating mechanism when one of said forks arrives at a certain lifted position, and means for causing said forks to automatically return to their normal initial position.

6. A hay loader, comprising a frame, a lifting fork hinged on said frame and adapted to extend in a forwardly inclined direction toward the ground for picking up hay therefrom, a loading fork hinged on said frame on a separate axis and having tines extending alternately between the tines of said lifting fork, mechanism operated through the movement of the vehicle for swinging said lifting fork upwardly and simultaneously causing said loading fork to remove the hay from said lifting fork and discharge the same in a rearward direction, means for automatically disconnecting said forks from their operating mechanism when one of said forks arrives at a certain lifted position, and manually controlled means for re-connecting said forks to said operating mechanism.

7. A device of the class described, comprising a vehicle supported on wheels, a lifting fork hinged to said vehicle and extending downwardly in front of said vehicle for picking up hay from the ground, a loading fork hinged to said vehicle above said lifting fork and having tines arranged to pass through the spaces between the tines of said lifting fork, mechanism connecting said forks with one or more of the wheels of the vehicle and adapted to cause said loading fork to remove the hay from said lifting fork and discharge it in a backward direction upon said vehicle, a clutch controlling the operation of said mechanism, and means for automatically opening said clutch when said one fork arrives at a certain lifted position.

8. The combination of a vehicle frame having thereon a receptacle, a pair of traction wheels located below said frame and adapted to support part of the weight of said receptacle, said vehicle frame being extended a considerable distance rearward of said receptacle and being adapted at its rearward end for connection to draft animals, a lifting fork hinged near the front of said vehicle and adapted to extend downwardly toward the ground for lifting hay therefrom, a loading fork hinged on said vehicle on an axis above that of said lifting fork, mechanism connecting said forks with said traction wheels and adapted to operate said forks so as to transfer the hay from said lifting to said loading fork and discharge it in a backward direction, means for automatically disconnecting said forks from said traction wheels when said loading fork arrives at a certain lifted position, and manually controlled means for connecting said forks with said traction wheels at the will of an operator.

Signed at Gibbon, Nebraska, this 2nd day of December 1907.

CHARLES M. LEE.

Witnesses:
AUGUST C. TILGNER,
W. C. OGILVIE.